US012638916B2

(12) United States Patent
Bridon et al.

(10) Patent No.: US 12,638,916 B2
(45) Date of Patent: May 26, 2026

(54) DYNAMIC SCALE FOR VECTOR GRAPHIC RENDERING

(71) Applicant: Apple Inc., Cupertino, CA (US)

(72) Inventors: Jeremy G Bridon, Mountain View, CA (US); James A McCombe, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 18/643,549

(22) Filed: Apr. 23, 2024

(65) Prior Publication Data

US 2024/0377884 A1 Nov. 14, 2024

Related U.S. Application Data

(60) Provisional application No. 63/465,634, filed on May 11, 2023.

(51) Int. Cl.
| | |
|---|---|
| *G06F 3/01* | (2006.01) |
| *G06T 15/04* | (2011.01) |
| *G06T 15/20* | (2011.01) |

(52) U.S. Cl.
CPC .............. *G06F 3/013* (2013.01); *G06T 15/04* (2013.01); *G06T 15/20* (2013.01); *G06F 3/012* (2013.01)

(58) Field of Classification Search
CPC .......... G06F 3/013; G06F 3/012; G06F 3/011; G06T 15/04; G06T 15/20; G06T 2210/36
See application file for complete search history.

(56) References Cited

U.S. PATENT DOCUMENTS

| | | | |
|---|---|---|---|
| 11,194,389 B2 | 12/2021 | Vanreenen et al. | |
| 2007/0252833 A1* | 11/2007 | Kuroki | G06T 15/20 |
| | | | 345/427 |
| 2012/0127284 A1* | 5/2012 | Bar-Zeev | G06T 19/006 |
| | | | 348/158 |
| 2017/0287446 A1 | 10/2017 | Young et al. | |
| 2017/0372457 A1 | 12/2017 | Sylvan et al. | |

(Continued)

OTHER PUBLICATIONS

"Advanced VR Graphics Techniques"; Apr. 12, 2022; pp. 1-40; Version 1.0.

(Continued)

*Primary Examiner* — Grace Q Li
(74) *Attorney, Agent, or Firm* — Thompson Hine LLP

(57) ABSTRACT

Various implementations disclosed herein include devices, systems, and methods for providing a view of a three-dimensional (3D) environment by rasterizing vector graphics (e.g., text) on separated two-dimensional (2D) assets within the 3D environment. For example, a process may include obtaining drawing commands corresponding to a vector graphic to be displayed. The process may further include obtaining fall-off data corresponding to changes in perception of resolution for different portions of a display and obtaining viewer position data corresponding to a viewpoint position for the view. The process may further include determining a scale factor for the rasterizing the vector graphic and providing a texture (e.g., image) on a surface of the asset within the 3D environment by rasterizing the vector graphic using the drawing commands and the scale factor. The process may further include rendering a view of the 3D environment based on the viewpoint position.

19 Claims, 7 Drawing Sheets

(56)                    References Cited

U.S. PATENT DOCUMENTS

| | | | | |
|---|---|---|---|---|
| 2018/0288423 | A1* | 10/2018 | Vembar | H04N 19/124 |
| 2020/0380744 | A1* | 12/2020 | Valient | G06T 3/047 |
| 2021/0142145 | A1* | 5/2021 | Bastani | G06N 3/0464 |
| 2022/0076389 | A1* | 3/2022 | Inada | G06T 3/18 |
| 2022/0198708 | A1* | 6/2022 | Ashcroft | G06V 20/10 |
| 2022/0375146 | A1 | 11/2022 | Bridon et al. | |
| 2023/0196657 | A1* | 6/2023 | Ichiba | G06F 3/013 |
| | | | | 345/419 |

OTHER PUBLICATIONS

Mohanto, Bipul, Islam, Abm Tariqul, Gobbeti, Enrico and Staadt, Oliver; "An integrative view of foveated rendering"; Computers & Graphics 102 (2022)pp. 474-501.
"Real-Time 3D Art Best Practices: Texturing"; Mar. 1, 2020, pp. 1-29; Version 1.0.

* cited by examiner

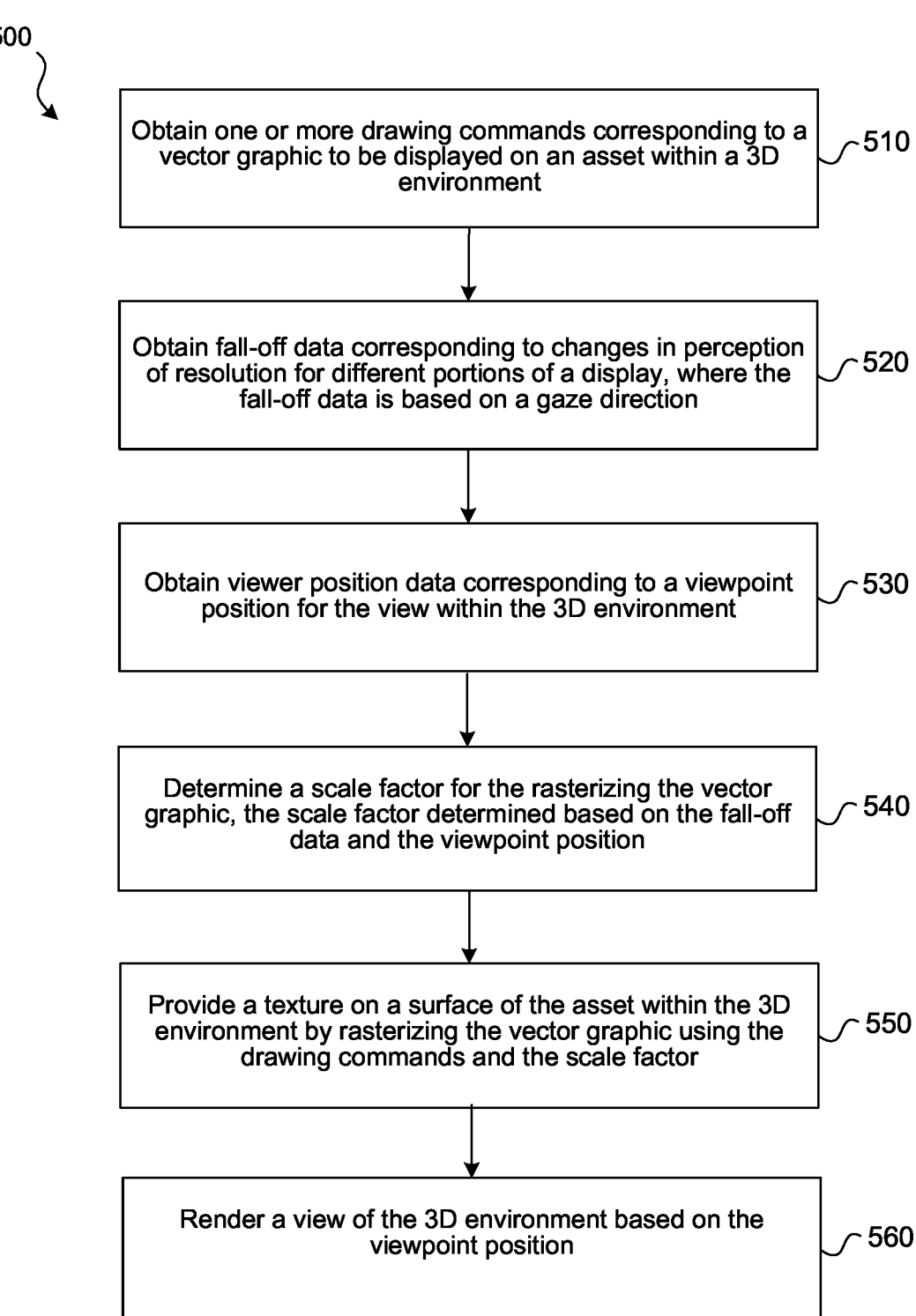

500

Obtain one or more drawing commands corresponding to a vector graphic to be displayed on an asset within a 3D environment ⌒510

Obtain fall-off data corresponding to changes in perception of resolution for different portions of a display, where the fall-off data is based on a gaze direction ⌒520

Obtain viewer position data corresponding to a viewpoint position for the view within the 3D environment ⌒530

Determine a scale factor for the rasterizing the vector graphic, the scale factor determined based on the fall-off data and the viewpoint position ⌒540

Provide a texture on a surface of the asset within the 3D environment by rasterizing the vector graphic using the drawing commands and the scale factor ⌒550

Render a view of the 3D environment based on the viewpoint position ⌒560

FIG. 5

Device 600

| Processing Unit(s) 602 | Comm. Interface(s) 608 | Display(s) 612 |

604

| I/O Device(s) & Sensor(s) 606 | Programming Interface(s) 610 | Image Sensor System(s) 614 |

Memory 620

Operating System 630

Instruction Set(s) 640

Content Instruction Set 642

Physiological Tracking Instruction Set 644

VRR Analysis Instruction Set 646

DYNAMIC SCALE FOR VECTOR GRAPHIC RENDERING

CROSS-REFERENCE TO RELATED APPLICATIONS

This Application claims the benefit of U.S. Provisional Application Ser. No. 63/465,634 filed May 11, 2023, which is incorporated herein in its entirety.

TECHNICAL FIELD

The present disclosure generally relates to systems, methods, and electronic devices for rendering a view of a three-dimensional (3D) environment by rasterizing vector graphics on separated two-dimensional (2D) assets.

BACKGROUND

Existing rendering techniques may use an undesirable amount of an electronic device's resources (e.g., a computer processing unit (CPU) and/or a graphical processing unit (GPU) computation, time, power, etc.). Existing rendering techniques may not accurately or efficiently depict complex vector graphics (e.g., text) legible, no matter the viewpoint. Further, existing rendering techniques may not provide perspective correct graphics for content imported or otherwise provided from existing applications and/or different environments. For example, two-dimensional (2D) content may not be displayed with accurate perspective when imported into and thus viewed within a rendered 3D environment. Thus, there is a need for improved techniques for rendering text and/or user interfaces at different scales based on a distance to the user, while ensuring uniformity of scale for each text/UI object.

SUMMARY

Various implementations disclosed herein include devices, systems, and methods that provide a view of a three-dimensional (3D) environment by rasterizing vector graphics (e.g., text) on separated two-dimensional (2D) assets within the 3D environment and then rendering a view of the 3D environment. The separated 2D assets may be user interface windows, buttons, etc., and may be defined as spatially-separated layers in a hierarchical drawing commands framework. The vector graphics may be rasterized to account for human vision fall-off from gaze direction to avoid over-sampling and undersampling by using scale factors that are based on target resolutions for each spatially-separated layer.

In some implementations, the scale factor may be determined based not just on target resolutions but based on a ratio between "point units" of a layer itself and a target resolution. For example, a web browser window may be 800×800 points in size and this is invariant regardless of its distance and orientation to the user. However, once this undergoes 3D perspective projection, this will map to a varying number of pixels in the target resolution.

In some implementations, the scale factor may be variable within a single layer (e.g., user interface window). Although some implementations may select a maximum computed scale factor within a single layer, varying scale factors may be utilized within each layer by breaking the layer into zones, rather than having to select one scale for the entire layer.

In some implementations, the scale factors are determined based on vector graphic drawing commands, expected eye resolution fall-off based on gaze direction, and/or a viewer position (e.g., a six degrees of freedom (6-DoF) pose) relative to the 2D assets. In some implementations, the expected eye resolution fall-off may be determined based on a variable rate rasterization (VRR) map. With the addition of VRR, the target resolution may become variable based on which zone of the display the pixels are in. Additionally, the VRR map values may be derived based on human perception of resolution across a visual field.

In some implementations, the rasterization process may be separated from other applications. For example, the rasterization process may be provided by a separate server process on a display device so that gaze information (e.g., via the VRR map) is not provided to the application (e.g., a third-party application), and therefore, protecting user privacy by not sharing the user gaze information.

Some implementations assess physiological data (e.g., gaze information) and other user information to help improve a user experience. In such processes, user preferences and privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user should have the ability to access and otherwise find out anything that the system has collected or determined about him or her.

In general, one innovative aspect of the subject matter described in this specification can be embodied in methods that include the actions of, at a device having a processor, obtaining one or more drawing commands corresponding to a vector graphic to be displayed on an asset within a 3D environment, obtaining fall-off data corresponding to changes in perception of resolution for different portions of a display, wherein the fall-off data is based on a gaze direction, obtaining viewer position data corresponding to a viewpoint position for the view within the 3D environment, determining a scale factor for the rasterizing the vector graphic, the scale factor determined based on the fall-off data and the viewpoint position, providing a texture on a surface of the asset within the 3D environment by rasterizing the vector graphic using the drawing commands and the scale factor, and rendering a view of the 3D environment based on the viewpoint position.

These and other embodiments may each optionally include one or more of the following features.

In some aspects, the asset corresponds to a spatially-separated layer of multiple spatially-separated layers of virtual content of the 3D environment, and the scale factor is a single scale factor that is applied to rasterize all vector graphics within the spatially-separated layer. In some aspects, the spatially-separated layer is a free floating window in the 3D environment. In some aspects, the asset corresponds to multiple perceptual resolution zones and the scale factor is selected to correspond to a highest resolution of the multiple perceptual resolution zones.

In some aspects, the fall-off data includes a two-dimensional (2D) mapping identifying zones around a center position, wherein the center position is determined based on the gaze direction. In some aspects, determining the scale factor for the rasterizing the vector graphic includes projecting the 2D mapping into the 3D environment, identifying a zone of the zones that corresponds with the asset in the 3D environment, and selecting the scale factor based on the identified zone. In some aspects, selecting the scale factor is further based on, determining a target resolution for each spatially-separated layer of multiple spatially-separated layers, and determining a ratio between point units of a selected spatially-separated layer and a corresponding target resolution of the selected spatially-separated layer.

In some aspects, the scale factor is selected based on the identified zone and a distance of the asset from the viewpoint position. In some aspects, the scale factor is determined to be a relatively higher scale factor when the distance is less than a threshold and determined to be a relatively lower scale factor when the distance is greater than the threshold.

In some aspects, the method is performed via a process separate from an application that provides the drawing commands, wherein the fall-off data is not provided to the application. In some aspects, the viewer position data corresponding to the viewpoint position includes a pose of the device or a head of a user wearing the device. In some aspects, the viewer position data corresponding to the viewpoint position includes six degrees of freedom (6DOF) position data.

In some aspects, the fall-off data includes a variable rate rasterization (VRR) map. In some aspects, the 3D environment includes an extended reality (XR) environment. In some aspects, the device is a head mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart illustrating a method for rendering a view of a three-dimensional (3D) environment based on a scale factor and a viewpoint position in accordance with some implementations.

Figure 1:
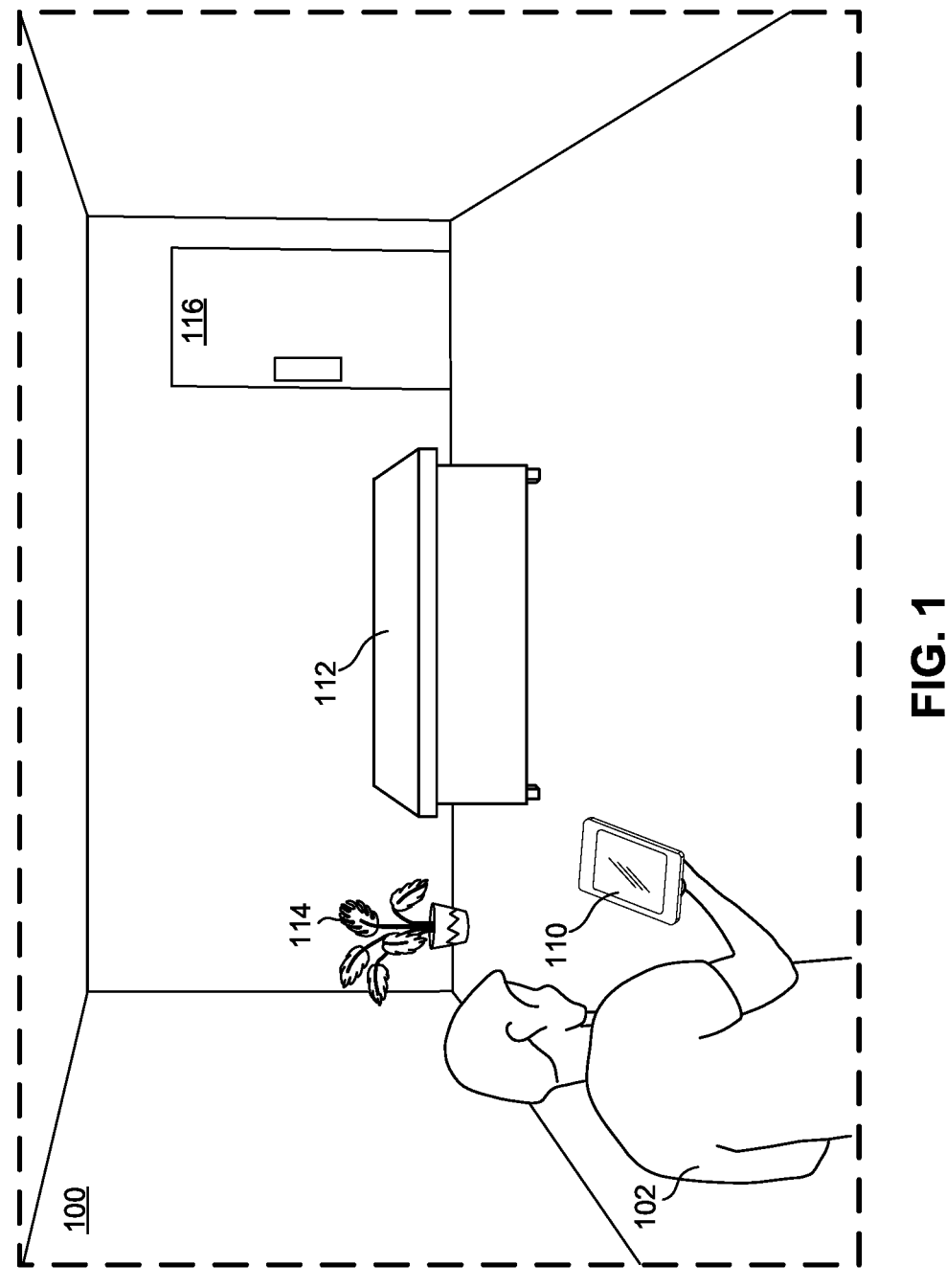
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 112, a plant 114, and a door 116. The electronic device 110 includes one or more cameras, microphones, depth sensors, or other sensors that can be used to capture information about and evaluate the physical environment 100 and the objects within it, as well as information about the user 102 of the electronic device 110. The information about the physical environment 100 and/or user 102 may be used to provide visual and audio content and/or to identify the current location of the physical environment 100 and/or the location of the user within the physical environment 100. In some implementations, views of an extended reality (XR) environment may be provided to one or more participants (e.g., user 102 and/or other participants not shown). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may have direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

In some implementations, the device 110 obtains physiological data (e.g., EEG amplitude/frequency, pupil modulation, eye gaze saccades, etc.) from the user 102 via one or more sensors (e.g., a user facing camera). For example, the device 110 obtains pupillary data (e.g., eye gaze characteristic data) and may determine a gaze direction of the user 102. While this example and other examples discussed herein illustrates a single device 110 in a real-world physical environment 100, the techniques disclosed herein are applicable to multiple devices and multiple sensors, as well as to other real-world environments/experiences. For example, the functions of the device 110 may be performed by multiple devices.

Figure 2:
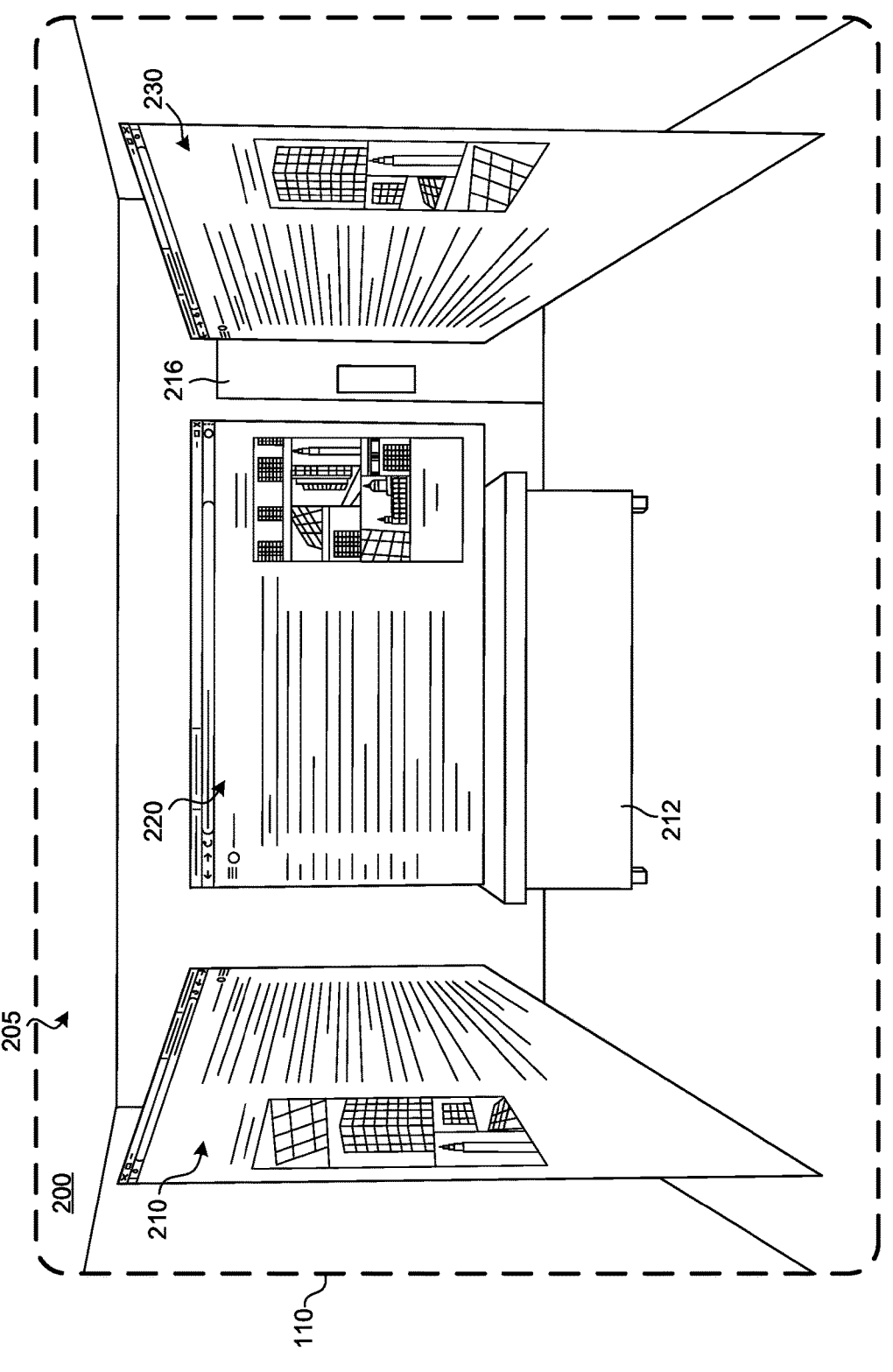
FIG. 2 illustrates a view of an extended reality (XR) environment provided by the device of FIG. 1 in accordance with some implementations.

FIG. 2 illustrates a view 200 of an XR environment 205 provided by the device 110 of FIG. 1 in accordance with some implementations. FIG. 2 includes a representation 212 of desk 112 and representation 216 of door 116 (e.g., a representation of a physical object that may be viewed as pass-through video or may be a direct view of the physical object through a transparent or translucent display). Additionally, FIG. 2 includes exemplary user interface's 210, 220, 230, of one or more applications (e.g., an immersive display of three window applications). Providing such a view 200 may involve determining 3D attributes of the physical environment 100 and positioning virtual content, e.g., user interfaces 210, 220, and/or 230 in a 3D coordinate system corresponding to that physical environment 100.

In the example of FIG. 2, the user interfaces 210, 220, 230 include various content items, including background portions, application portions, and one or more control elements (e.g., selectable icons). The user interfaces 210, 220, 230 are simplified for purposes of illustration and user interfaces in practice may include any degree of complexity, any number of content items, and/or combinations of 2D and/or 3D content. The user interfaces 210, 220, 230 may be provided by operating systems and/or applications of various types including, but not limited to, messaging applications, web browser applications, content viewing applications, content creation and editing applications, or any other applications that can display, present, or otherwise use visual and/or audio content.

Figure 3:
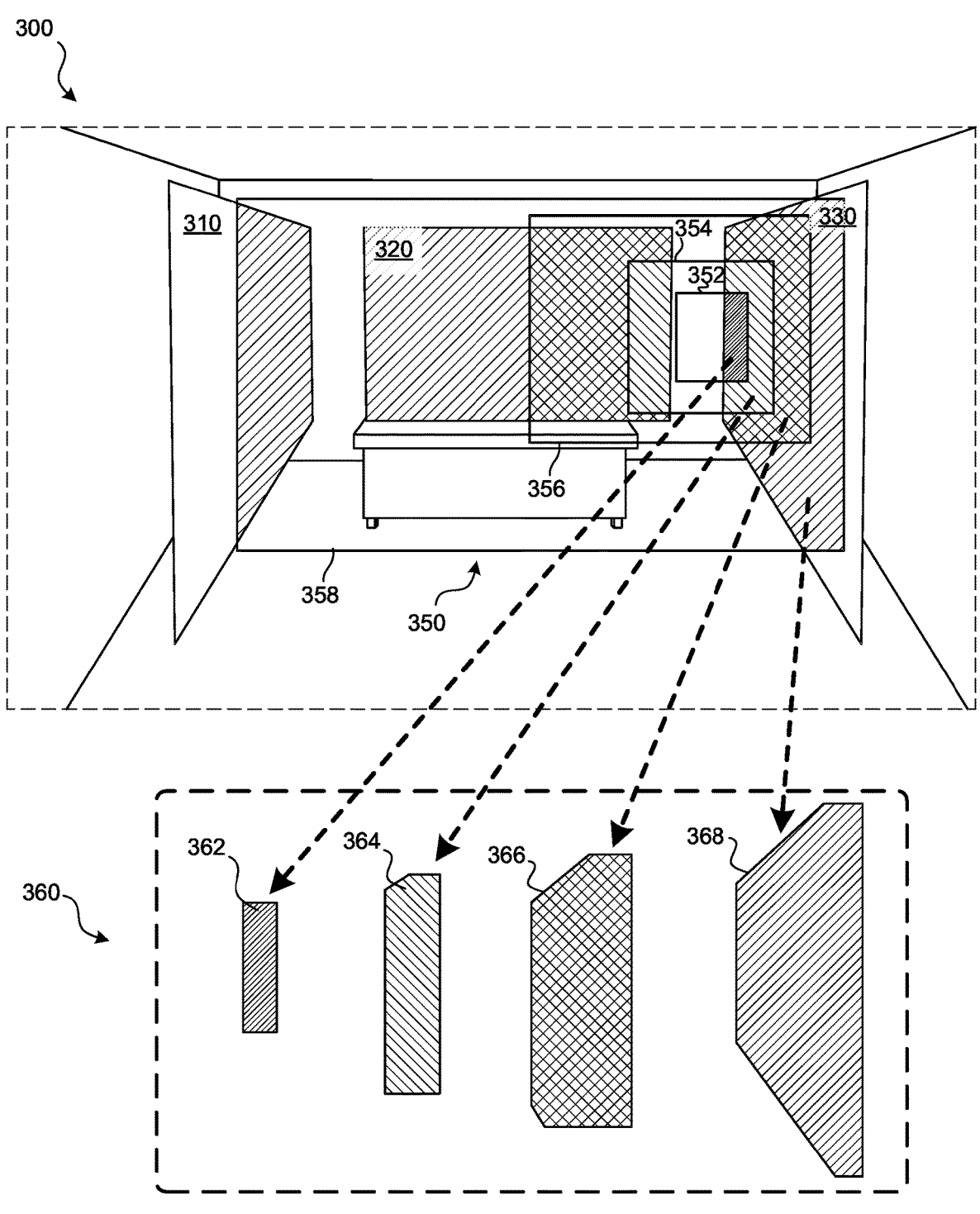
FIG. 3 illustrates a view of a gaze direction visualization map of the XR environment of FIG. 2 in accordance with some implementations.

FIG. 2 provides a view 200 of a 3D environment (e.g., XR environment 205) by rasterizing vector graphics (e.g., text) on separated 2D assets (e.g., separate windows, such as user interfaces 210, 220, and 230) within the 3D environment and then rendering a view of the 3D environment (e.g., view 200 of XR environment 205). The separated 2D assets may be windows (e.g., separate windows, such as user interfaces 210, 220, and 230), but may be other virtual/content elements such as buttons, etc., and may be defined as spatially-separated layers in a hierarchical drawing commands framework. The vector graphics may be rasterized to account for human vision fall-off from gaze direction (e.g., avoiding over-sampling and undersampling) by using scale factors (e.g., based on target resolutions) and may be illustrated by a gaze direction visualization map. FIG. 3 illustrates an example gaze direction visualization map of the user interfaces 210, 220, 230 for the view 200 of the XR environment 205.

FIG. 3 illustrates a view 300 of a gaze direction visualization map 350 of the view 200 of the XR environment of FIG. 2 in accordance with some implementations. In particular, FIG. 3 illustrates a gaze direction visualization map 350, a representation 310 for the user interface 210, representation 320 for the user interface 220, and representation 330 for the user interface 230. The gaze direction visualization map 350 illustrates an expected eye resolution fall-off based on a gaze direction by using scale factors (e.g., based on target resolutions) that are determined based on: (a) vector graphic drawing commands, (b) expected eye resolution fall-off based on gaze direction (e.g., a variable rate rasterization (VRR) map), and (c) viewer position (e.g., 6DOF pose) relative to the 2D assets. For example, a user may be focusing his or her gaze direction at a center (e.g., focal point) of focal zone 352. The expected eye gaze fall-off from the focal point is illustrated as the gaze direction visualization map 350 expands further from the focal point (e.g., peripheral vision acuity declines the further distance away from a focal point). For example, the center zone, focal zone 352 may be determined as a particular size (e.g., 1 m×1 m), and the subsequent zones (e.g., focal zone 354, focal zone 356, and focal zone 358), may be determined based on scale factor from the central zone (e.g., focal zone 352). For example, the scale factor for focal zone 354 may be a factor of two ("2×") of the central zone, the scale factor for focal zone 356 may be a factor of four ("4×") of the central zone, and the scale factor for focal zone 358 may be a factor of eight ("8×") of the central zone.

FIG. 3 further illustrates determining a scale factor for the rasterizing of the vector graphics for each 2D asset (e.g., for each user interface 210, 220, 230). The scale factor may be determined based on the fall-off data and a viewpoint position of the user. For example, as illustrated in the FIG. 3 for the representation 330 for the user interface 230, the four focal zones that intersect a portion of the representation 330 are expanded upon at the focal zone representation 360 (e.g., focal area 362 corresponding to the area that intersects focal zone 352 with the representation 330, focal area 364 corresponding to the area that intersects focal zone 354 with the representation 330, focal area 366 corresponding to the area that intersects focal zone 356 with the representation 330, and focal area 368 corresponding to the area that intersects focal zone 358 with the representation 330). In some implementations, based on at least a portion of the right window (e.g., representation 330 for the user interface 230) corresponding to the center zone of the VRR map (e.g., focal zone 352 of the gaze direction visualization map 350) and its distance from the viewer position, a high resolution (4×) scale factor may be selected for the user interface 230 (e.g., the right window).

Further, based on at least a portion of the middle window (e.g., representation 320 for the user interface 220) corresponding to the second from center zone of the VRR map (e.g., focal zone 354 of the gaze direction visualization map 350) and its distance from the viewer position, a medium (3×) scale factor may be selected for the middle window. Moreover, based on at least a portion of the left window (e.g., representation 330 for the user interface 230) corresponding to the fourth from center zone of the VRR map (e.g., focal zone 358 of the gaze direction visualization map 350) and its distance from the viewer position, a low (2×) scale factor (or less) may be selected for the left window (user interface 210).

In some implementations, determining a scale factor for rasterizing vector graphics based on eye gaze fall-off data and a viewpoint position is based on generating a VRR map, and the VRR map may be generated based on generating VRR rectangles per eye. An exemplary process may include quantizing the VRR map into Log 2 scale zones, i.e., foveal center is 1× scale then 2×, 4×, 8× towards the periphery. Each zone may be defined as a rectangle in normalized device coordinate (NDC) screen coordinates and may be used later to clip a convex layer quadrilateral polygon. In some implementations, to calculate the extents of these zone rectangles, the system may scan the horizontal and vertical VRR tiles. For a VRR tile, the system may take the maximum of the horizontal and vertical scale to set its effective resolution. For example, a horizontal scale of eight (H=8) and a vertical scale of one (V=1) may still be considered part of the low-resolution 8× zone. This determination may be utilized since the outer fovea doesn't actually benefit from this extra resolution since the human eye isn't anisotropic in its resolution. The anisotropic nature of the VRR map may be a side-effect of how VRR is implemented for expediency in hardware, i.e., making the generation and usage of a VRR map a 2D separable function.

In some implementations, providing a texture (e.g., image) on a surface (e.g., a flat/2D surface) of an asset (e.g., user interface 210, 220, 230) within the 3D environment by rasterizing vector graphics using drawing commands and a scale factor may be based on calculating texture layers that may be executed per separated layer. In some implementations, calculating texture layers may be determined per eye, and per VRR zone rectangle (e.g., from largest to smallest with early bail-out condition) based on a texture layer process. The texture layer process may include: (i) clipping layer bounds (e.g., a convex 4 sided polygon) against each VRR zone rectangle as generated previously, (ii) for each edge in the clipped layer polygon, calculating the ratio between a texture coordinate length and a screen edge length (e.g., VRR zone scale), and (iii) determining the maximum required scale of all edges in the polygon and use that as the required scale for the particular VRR zone. In some implementations, clipping layer bounds similar to a GPU in projecting clip-coordinates by: (i) intersecting each component against six planes of the cardinal axes defined by the W component after projection plus a seventh clip against W=0 to handle vertices behind the viewer, produce up to one new vertex in the resulting polygon per clip plane (e.g., in theory, up to an eleven vertex polygon could result), and (iii) generating clipped texture coordinates in layer space (e.g., to determine which parts of the texture contents need to be rendered at each VRR scale). In some implementations, if an animation processing system for the associated device (e.g., device 110) does not support VRR zones, a single worst case scale factor may be extracted for the particular layer using a conservative cropping rectangle.

In some implementations, calculating textured layers may generate an array of [scale, rectangle] pairs in a layer space that may be used to generate a VRR map for each layer. In some implementations, if an animation processing system for the associated device (e.g., device 110) were modified to work with VRR mapping techniques described herein, the resolution of the required assembly texture may be modified to save more memory bandwidth, GPU cycles, and power.

Figure 4:
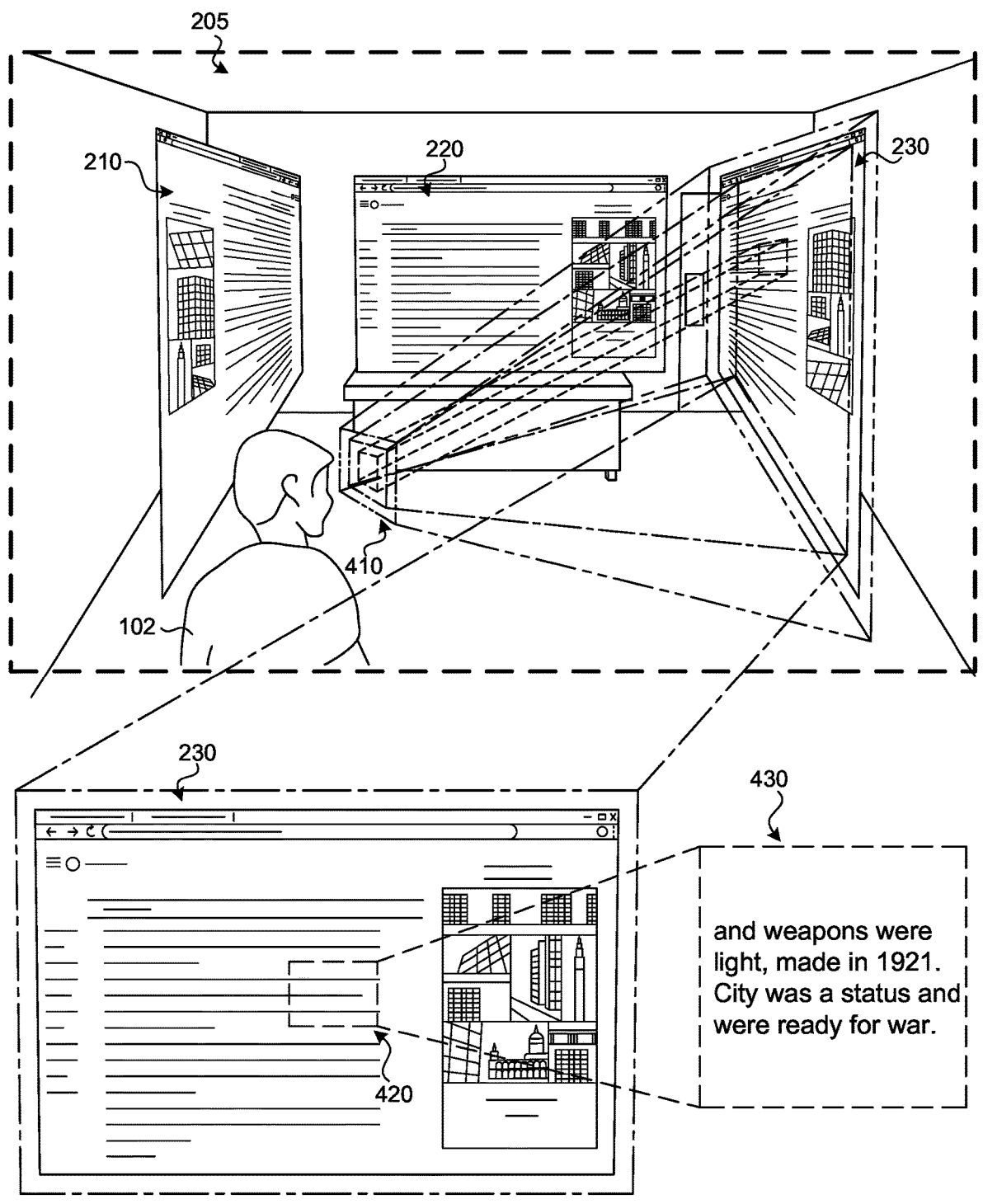
FIG. 4 illustrates rendering a view of content being displayed for the XR environment of FIG. 2 based on a scale factor in accordance with some implementations.

FIG. 4 illustrates rendering a view of content being displayed for the XR environment of FIG. 2 based on a scale factor in accordance with some implementations. In particular, FIG. 4 illustrates using scale factors (e.g., based on target resolutions) that are determined based on (a) vector graphic drawing commands, (b) expected eye resolution fall-off based on gaze direction (e.g., a VRR map), and (c) viewer position (e.g., 6DOF pose) relative to the 2D assets (e.g., user interface 210, 220, 230). For example, the gaze direction and the expected eye resolution fall-off based on gaze direction is illustrated by the gaze view box 410, which predicts the expected eye resolution fall-off zones based on a gaze direction detected by the device 110 for the user 102. Thus, as illustrated in FIG. 4, the gaze direction focal point of the user 102 is detected at the focus area 420, which is blown up and illustrated in area 430 (e.g., the focus of the user 102 as he or she is reading text displayed on the user interface 230).

In some implementations, based on detecting the focus area 420 (e.g., focal zone 352 of the gaze direction visualization map 350 in FIG. 3), the system may then rasterize the vector graphics (e.g., text) for the entire user interface 230 at the same scale factor (e.g., higher resolution), because the system has detected the user is reading (e.g., focused) on that particular 2D asset (interface window). The vector graphics may be rasterized to account for human vision fall-off from gaze direction (e.g., to avoid over-sampling and undersampling) by using the scale factors (e.g., based on target resolutions). The scale factor may be determined based on (a) vector graphic drawing commands (b) expected eye resolution fall-off based on gaze direction (e.g., a VRR map) and (c) viewer position (e.g., 6DOF pose) relative to the 2D assets.

In some implementations, the rasterization process may be separated from other application providers/developers. For example, the expected eye resolution fall-off data based on gaze direction (e.g., as illustrated by the gaze view box 410) may not be provided to other application developers. For example, the information associated with the determined expected eye resolution fall-off data based on gaze direction may be determined by a separate server process on the device 110 so that gaze information (e.g., the VRR map) is not provided to the other application providers/developers, e.g., protecting user privacy.

FIG. 5 is a flowchart illustrating a method 500 for rendering a view of a 3D environment based on a scale factor and a viewpoint position in accordance with some implementations. In some implementations, a device such as electronic device 110 performs method 500. In some implementations, method 500 is performed on a mobile device, desktop, laptop, HMD (e.g., device 110), or server device. The method 500 is performed by processing logic, including hardware, firmware, software, or a combination thereof. In some implementations, the method 500 is performed on a processor executing code stored in a non-transitory computer-readable medium (e.g., a memory). In some implementations, the device performing the method 500 includes a processor and one or more sensors.

At block 510, the method 500 obtains one or more drawing commands corresponding to a vector graphic to be displayed on an asset within a 3D environment. For example, an asset may include window(s), button(s), and the like, displayed on a graphical user interface within a 3D environment (e.g., user interface 210, 220, and 230 of view 200 of FIG. 2). In some implementations, the one or more drawing commands include serialized drawing commands for drawing text, glyphs, geometric primitives such as circles, and other vector graphics in a 2D window/separated layer to be shown on a flat surface positioned within a 3D environment (e.g., an XR environment). For example, the one or more drawing commands may be displayed by a source that could be an application running on a source electronic device (e.g., smartphone or tablet device, an HMD, etc.) that generates a view including text and/or other virtual content (e.g., a user interface) for viewing.

At block 520, the method 500 obtains fall-off data corresponding to changes in perception of resolution for different portions of a display, where the fall-off data is based on a gaze direction. In some implementations, the fall-off data includes a variable rate rasterization (VRR) map (e.g., gaze direction visualization map 350).

At block 530, the method 500 obtains viewer position data corresponding to a viewpoint position for the view within the 3D environment. In some implementations, the viewer position data corresponding to the viewpoint position includes a pose of the device or a head of a user wearing the device. In some implementations, the viewer position data corresponding to the viewpoint position includes six degrees of freedom (6DOF) position data (e.g., 6DOF pose of the user). For example, as illustrated in FIG. 4, the user's 102 viewpoint position and central focus is illustrated by the gaze view box 410, where the gaze direction focal point of the user 102 is detected at the focus area 420, which is blown up and illustrated in area 430 (e.g., the focus of the user 102 as he or she is reading text displayed on the user interface 230).

At block 540, the method 500 determines a scale factor for the rasterizing the vector graphic, where the scale factor is determined based on the fall-off data and the viewpoint position. In some implementations, the scale factor is based on a ratio between layer point units and a target resolution for the layer. For example, a web browser window may be 800×800 points in size and this is invariant regardless of its distance and orientation to the user. For example, based on at least a portion of a first window corresponding to a center zone of a VRR map and its distance from the viewer position, a high resolution scale factor (e.g., 4×) may be selected for the first window (e.g., user interface 230), and based on at least a portion of a second window corresponding to an adjacent zone (e.g., second level from the center zone) of the VRR map and its distance from the viewer position, a medium or low scale factor (e.g., 2× or 3×) is selected for the second window (e.g., user interface 220).

In some implementations, the VRR map values may be derived based on human perception of resolution across a visual field. For example, with the addition of VRR, a target resolution for a particular window may become variable based on which zone of the display the pixels are in.

In exemplary implementations, a uniform scale factor may be applied for all vector graphics within one of the assets/separated layers. A scale factor may be applied to the entire 2D asset (e.g., a window such as the window associated with user interface 230) to ensure uniformity and to avoid artifacts within the asset. For example, using the same scale factor for an entire separated layer/window even if different parts of the separated layer/window are associated with different VRR zones. For example, as illustrated in FIG. 3, the entire right window (e.g., user interface 230) may have a scale factor of 4× (e.g., higher resolution) based on part of the window being associated with the smallest VRR zone (e.g., focal zone 352).

In particular, in some implementations, the asset corresponds to a spatially-separated layer of multiple spatially-separated layers of virtual content of the 3D environment, and the scale factor is a single scale factor that is applied to rasterize all vector graphics within the spatially-separated layer. In some implementations, the spatially-separated layer is a free floating window in the 3D environment. In some implementations, the asset corresponds to multiple perceptual resolution zones and the scale factor is selected to correspond to a highest resolution of the multiple perceptual resolution zones.

In exemplary implementations, the scale factor may be determined based on a foveal center position associated with a gaze of the viewer. In some implementations, the fall-off data includes a two-dimensional (2D) mapping identifying zones (e.g., rectangles) around a center position (foveal center), wherein the center position is determined based on the gaze direction. In some implementations, determining the scale factor for the rasterizing the vector graphic includes projecting the 2D mapping into the 3D environment, identifying a zone of the zones that corresponds with the asset in the 3D environment, and selecting the scale factor based on the identified zone.

In some implementations, selecting the scale factor is further based on determining a target resolution for each spatially-separated layer of multiple spatially-separated layers, and determining a ratio between point units of a selected spatially-separated layer and a corresponding target resolution of the selected spatially-separated layer. For example, a web browser window may be 800×800 points in size and this is invariant regardless of the web browser window distance and orientation to the user. However, once the web browser window undergoes 3D perspective projection, this may map to a varying number of pixels for a target resolution.

In some implementations, there is no direct mapping between the scale factor and a distance of the asset from the viewpoint position such that the systems and methods described herein do not utilize thresholds based on the distance to choose scale. Instead, if a layer is "far away", the 3D perspective projection may compress the layer's point units into a smaller set of target resolution pixels. Alternatively, in some implementations, the scale factor may be selected based on the identified zone and a distance of the asset from the viewpoint position. In some implementations, the scale factor is determined to be a relatively higher scale factor when the distance is less than a threshold and determined to be a relatively lower scale factor when the distance is greater than the threshold.

In some implementations, the scale factor may be variable within a single layer (e.g., user interface window). Although some implementations may select a maximum computed scale factor within a single layer, varying scale factors may be utilized within each layer by breaking the layer into zones, and selecting a scale factor for each zone within each layer, rather than having to select one scale for the entire layer.

At block 550, the method 500 provides a texture on a surface of the asset within the 3D environment by rasterizing the vector graphic using the drawing commands and the scale factor, and at block 560, the method 500 renders a view of the 3D environment based on the viewpoint position. For example, a texture such as an image or text may be displayed on a flat/2D surface of a user interface window within the 3D environment (e.g., view 200 of FIG. 2).

In some implementations, the method 500 is performed via a process separate from an application that provides the drawing commands, wherein the fall-off data is not provided to the application. For example, the method 500 may be provided and executed by a separate "server" process on the device so that gaze information (e.g., the VRR map) and pose of the viewer is not provided to the application source in order to protect user privacy (e.g., not share gaze information with third party applications).

Figure 6:
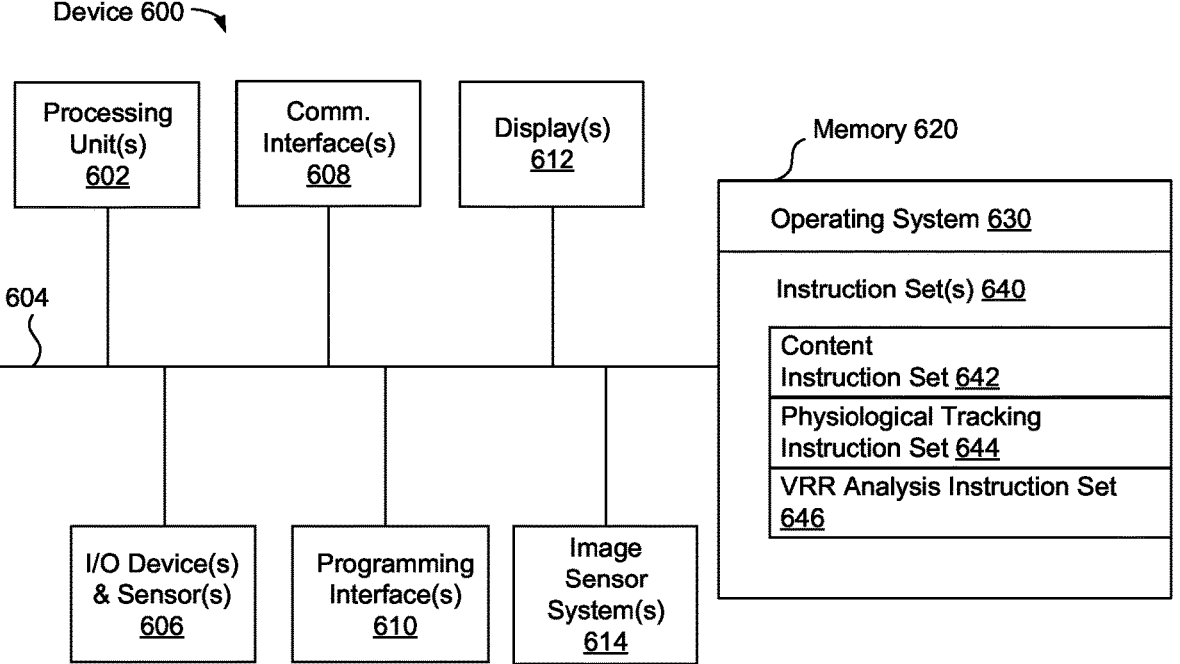
FIG. 6 is a block diagram of an electronic device of in accordance with some implementations.

FIG. 6 is a block diagram of electronic device 600. Device 600 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more output device(s) 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device (s) 612 include one or more displays configured to present a view of a 3D environment to the user. In some implementations, the one or more device(s) 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 600 includes a single display. In another example, the device 600 includes a display for each eye of the user.

In some implementations, the one or more output device (s) 612 include one or more audio producing devices. In some implementations, the one or more output device(s) 612 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 612 may additionally or alternatively be configured to generate haptics.

In some implementations, the one or more image sensor systems 614 are configured to obtain image data that corresponds to at least a portion of a physical environment. For example, the one or more image sensor systems 614 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of an electrical charge. In some implementations, the instruction set(s) 640 are software that is executable by the one or more processing units 602 to carry out one or more of the techniques described herein.

The instruction set(s) 640 includes a content instruction set 642, a physiological tracking instruction set 644, a VRR analysis instruction set 646. The instruction set(s) 940 may be embodied a single software executable or multiple software executables.

In some implementations, the content instruction set 642 is executable by the processing unit(s) 602 to provide and/or track content for display on a device. The content instruction set 642 may be configured to monitor and track the content over time (e.g., during an experience) and/or to identify change events that occur within the content (e.g., based on identified/classified behavior gaze events). In some implementations, the content instruction set 642 may be configured to provide and update vector graphics that are rasterized to account for human vision fall-off from gaze direction (avoiding over-sampling and undersampling) by using scale factors (e.g., based on target resolutions) that are determined based on vector graphic drawing commands, expected eye resolution fall-off based on gaze direction, and viewer position (e.g., 6DOF pose) relative to the 2D assets (e.g., user interface window(s)). To these ends, in various implementations, the instruction includes instructions and/or logic therefor, and heuristics and metadata therefor.

In some implementations, the physiological tracking instruction set 644 is executable by the processing unit(s) 602 to track a user's physiological attributes (e.g., EEG amplitude/frequency, pupil modulation, gaze, head pose/location data, heart rate, EDA data, etc.) using one or more of the techniques discussed herein or as otherwise may be appropriate. To these ends, in various implementations, the instruction includes instructions and/or logic therefor, and heuristics and metadata therefor.

In some implementations, the VRR analysis instruction set 646 is executable by the processing unit(s) 602 to determine a scale factor for the rasterizing of the vector graphics based on the eye gaze fall-off data and the viewpoint position using one or more of the techniques discussed herein or as otherwise may be appropriate. To these ends, in various implementations, the instruction includes instructions and/or logic therefor, and heuristics and metadata therefor.

Although the instruction set(s) 640 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 7:
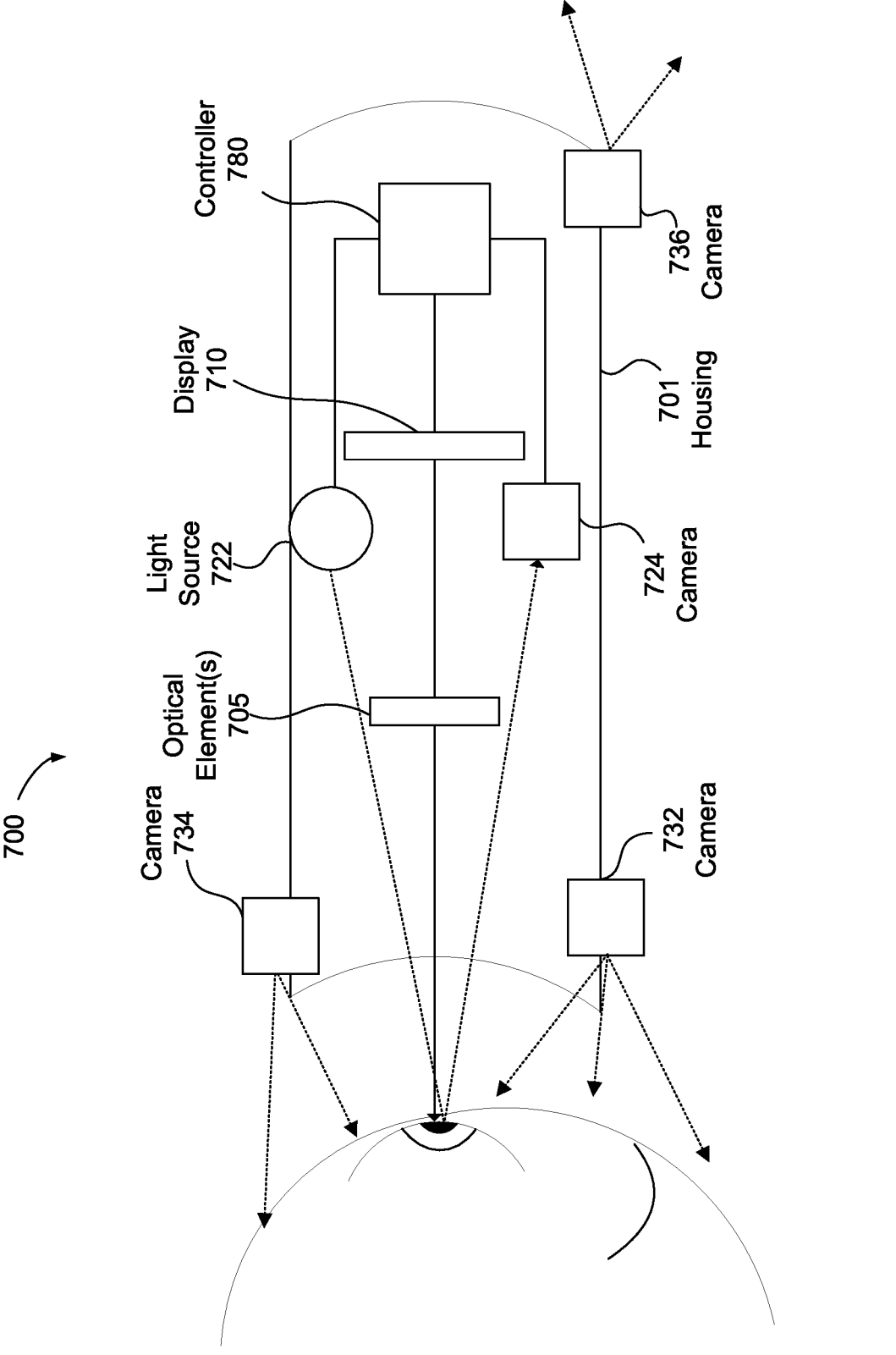
FIG. 7 is a block diagram of an exemplary head-mounted device in accordance with some implementations.

FIG. 7 illustrates a block diagram of an exemplary head-mounted device 700 in accordance with some implementations. The head-mounted device 700 includes a housing 701 (or enclosure) that houses various components of the head-mounted device 700. The housing 701 includes (or is coupled to) an eye pad (not shown) disposed at a proximal (to the user 102) end of the housing 701. In various implementations, the eye pad is a plastic or rubber piece that comfortably and snugly keeps the head-mounted device 700 in the proper position on the face of the user 102 (e.g., surrounding the eye of the user 102).

The housing 701 houses a display 710 that displays an image, emitting light towards or onto the eye of a user 102. In various implementations, the display 710 emits the light through an eyepiece having one or more optical elements 705 that refracts the light emitted by the display 710, making the display appear to the user 102 to be at a virtual distance farther than the actual distance from the eye to the display 710. For example, optical element(s) 705 may include one or more lenses, a waveguide, other diffraction optical elements (DOE), and the like. For the user 102 to be able to focus on the display 710, in various implementations, the virtual distance is at least greater than a minimum focal distance of the eye (e.g., 7 cm). Further, in order to provide a better user experience, in various implementations, the virtual distance is greater than 1 meter.

The housing 701 also houses a tracking system including one or more light sources 722, camera 724, camera 732, camera 734, camera 736, and a controller 780. The one or more light sources 722 emit light onto the eye of the user 102 that reflects as a light pattern (e.g., a circle of glints) that may be detected by the camera 724. Based on the light pattern, the controller 780 may determine an eye tracking characteristic of the user 102. For example, the controller 780 may determine a gaze direction and/or a blinking state (eyes open or eyes closed) of the user 102. As another example, the controller 780 may determine a pupil center, a pupil size, or a point of regard. Thus, in various implementations, the light is emitted by the one or more light sources 722, reflects off the eye of the user 102, and is detected by the camera 724. In various implementations, the light from the eye of the user 102 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 710 by looking at it), provide foveated rendering (e.g., present a higher resolution in an area of the display 710 the user 102 is looking at and a lower resolution elsewhere on the display 710), or correct distortions (e.g., for images to be provided on the display 710).

In various implementations, the one or more light sources 722 emit light towards the eye of the user 102 which reflects in the form of a plurality of glints.

In various implementations, the camera 724 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 732, camera 734, and camera 736 are frame/shutter-based cameras that, at a particular point in time or multiple points in time at a frame rate, may generate an image of the face of the user 102 or capture an external physical environment. For example, camera 732 captures images of the user's face below the eyes, camera 734 captures images of the user's face above the eyes, and camera 736 captures the external environment of the user (e.g., environment 100 of FIG. 1). The images captured by camera 732, camera 734, and camera 736 may include light intensity images (e.g., RGB) and/or depth image data (e.g., Time-of-Flight, infrared, etc.).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device having a processor:
obtaining one or more drawing commands corresponding to a vector graphic to be displayed on an asset within a 3D environment;
obtaining fall-off data corresponding to changes in perception of resolution for different portions of a display, wherein the fall-off data is based on a gaze direction;
obtaining viewer position data corresponding to a viewpoint position for a view of the 3D environment;
projecting a two-dimensional (2D) mapping that identifies zones into the 3D environment based on the fall-off data and the gaze direction;
identifying a zone of the zones that corresponds to the asset in the 3D environment;
determining a scale factor for rasterizing the vector graphic based on the identified zone, the fall-off data, and the viewpoint position;
providing a texture on a surface of the asset within the 3D environment by rasterizing the vector graphic using the drawing commands and the scale factor; and
rendering the view of the 3D environment based on the viewpoint position.

2. The method of claim 1, wherein the asset corresponds to a spatially-separated layer of multiple spatially-separated layers of virtual content of the 3D environment, and the scale factor is a single scale factor that is applied to rasterize all vector graphics within the spatially-separated layer.

3. The method of claim 2, wherein the spatially-separated layer is a free floating window in the 3D environment.

4. The method of claim 2, wherein the asset corresponds to multiple perceptual resolution zones and the scale factor is selected to correspond to a highest resolution of the multiple perceptual resolution zones.

5. The method of claim 1, wherein the 2D mapping identifies the zones around a center position, wherein the center position is determined based on the gaze direction.

6. The method of claim 1, wherein selecting the scale factor is further based on:
determining a target resolution for each spatially-separated layer of multiple spatially-separated layers; and
determining a ratio between point units of a selected spatially-separated layer and a corresponding target resolution of the selected spatially-separated layer.

7. The method of claim 1, wherein the scale factor is selected based on the identified zone and a distance of the asset from the viewpoint position.

8. The method of claim 7, wherein the scale factor is determined to be a relatively higher scale factor when the distance is less than a threshold and determined to be a relatively lower scale factor when the distance is greater than the threshold.

9. The method of claim 1, wherein the method is performed via a process separate from an application that provides the drawing commands, wherein the fall-off data is not provided to the application.

10. The method of claim 1, wherein the viewer position data corresponding to the viewpoint position comprises a pose of the device or a head of a user wearing the device.

11. The method of claim 1, wherein the viewer position data corresponding to the viewpoint position comprises six degrees of freedom (6DOF) position data.

12. The method of claim 1, wherein the fall-off data comprises a variable rate rasterization (VRR) map.

13. The method of claim 1, wherein the 3D environment comprises an extended reality (XR) environment.

14. The method of claim 13, wherein the device is a head mounted device (HMD).

15. A device comprising:

one or more sensors;

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining one or more drawing commands corresponding to a vector graphic to be displayed on an asset within a 3D environment;

obtaining fall-off data corresponding to changes in perception of resolution for different portions of a display, wherein the fall-off data is based on a gaze direction;

obtaining viewer position data corresponding to a viewpoint position for a view of the 3D environment;

projecting a two-dimensional (2D) mapping that identifies zones into the 3D environment based on the fall-off data and the gaze direction;

identifying a zone of the zones that corresponds to the asset in the 3D environment;

determining a scale factor for rasterizing the vector graphic based on the identified zone, the fall-off data, and the viewpoint position;

providing a texture on a surface of the asset within the 3D environment by rasterizing the vector graphic using the drawing commands and the scale factor; and rendering the view of the 3D environment based on the viewpoint position.

16. The device of claim 15, wherein the asset corresponds to a spatially-separated layer of multiple spatially-separated layers of virtual content of the 3D environment, and the scale factor is a single scale factor that is applied to rasterize all vector graphics within the spatially-separated layer.

17. The device of claim 16, wherein the spatially-separated layer is a free floating window in the 3D environment.

18. The device of claim 16, wherein the asset corresponds to multiple perceptual resolution zones and the scale factor is selected to correspond to a highest resolution of the multiple perceptual resolution zones.

19. A non-transitory computer-readable storage medium, storing program instructions executable on a device comprising one or more processors to perform operations comprising:

obtaining one or more drawing commands corresponding to a vector graphic to be displayed on an asset within a 3D environment;

obtaining fall-off data corresponding to changes in perception of resolution for different portions of a display, wherein the fall-off data is based on a gaze direction;

obtaining viewer position data corresponding to a viewpoint position for a view of the 3D environment;

projecting a two-dimensional (2D) mapping that identifies zones into the 3D environment based on the fall-off data and the gaze direction;

identifying a zone of the zones that corresponds to the asset in the 3D environment;

determining a scale factor for rasterizing the vector graphic based on the identified zone, the fall-off data, and the viewpoint position;

providing a texture on a surface of the asset within the 3D environment by rasterizing the vector graphic using the drawing commands and the scale factor; and rendering the view of the 3D environment based on the viewpoint position.

* * * * *